United States Patent
Cieslak et al.

(10) Patent No.: US 7,349,979 B1
(45) Date of Patent: **\*Mar. 25, 2008**

(54) METHOD AND APPARATUS FOR REDIRECTING NETWORK TRAFFIC

(75) Inventors: Martin Cieslak, Fremont, CA (US); Alexander G. Tweedly, Argyll (GB)

(73) Assignee: Cisco Technology, Inc., San Jose, CA (US)

( * ) Notice: Subject to any disclaimer, the term of this patent is extended or adjusted under 35 U.S.C. 154(b) by 722 days.

This patent is subject to a terminal disclaimer.

(21) Appl. No.: 09/608,802

(22) Filed: Jun. 30, 2000

Related U.S. Application Data (60) Provisional application No. 60/168,862, filed on Dec. 2, 1999.

(51) Int. Cl.
*G06F 15/173* (2006.01)

(52) U.S. Cl. .................................... 709/238

(58) Field of Classification Search ................ 709/228, 709/225, 232, 105, 240, 223, 201–203, 102, 709/239, 245, 224, 238; 707/103; 370/465, 370/312; 704/228; 718/105
See application file for complete search history.

(56) References Cited

U.S. PATENT DOCUMENTS

| | | | |
|---|---|---|---|
| 4,827,411 A | 5/1989 | Arrowood et al. | 364/300 |
| 4,965,772 A | 10/1990 | Daniel et al. | 364/900 |
| 5,452,447 A | 9/1995 | Nelson et al. | 395/650 |
| 5,511,208 A | 4/1996 | Boyles et al. | 395/800 |
| 5,555,244 A | 9/1996 | Gupta et al. | 370/60.1 |
| 5,572,512 A * | 11/1996 | Cutler et al. | 370/248 |
| 5,611,049 A | 3/1997 | Pitts | 395/200.09 |
| 5,644,713 A * | 7/1997 | Makishima | 709/242 |
| 5,673,265 A | 9/1997 | Gupta et al. | 370/432 |
| 5,751,971 A | 5/1998 | Dobbins et al. | 395/200.68 |
| 5,774,660 A | 6/1998 | Brandel et al. | 395/200.31 |
| 5,787,470 A * | 7/1998 | DeSimone et al. | 709/226 |
| 5,848,241 A | 12/1998 | Misinai et al. | 395/200.43 |
| 5,852,717 A | 12/1998 | Bhide et al. | 395/200.33 |
| 5,940,596 A * | 8/1999 | Rajan et al. | 709/242 |
| 5,950,205 A * | 9/1999 | Aviani, Jr. | 707/103 R |
| 6,006,264 A | 12/1999 | Colby et al. | 709/226 |
| 6,061,650 A * | 5/2000 | Malkin et al. | 704/228 |
| 6,167,438 A * | 12/2000 | Yates et al. | 709/216 |

(Continued)

OTHER PUBLICATIONS

File Server Scaling with Network-Attached Secure Disks, Garth A. Gibson et al., ACM 1997.*

(Continued)

*Primary Examiner*—Jason Cardone
*Assistant Examiner*—Ajay M Bhatia
(74) *Attorney, Agent, or Firm*—Beyer Weaver LLP

(57) ABSTRACT

Methods and apparatus are described for intelligently redirecting and/or processing traffic. In one embodiment, a method of facilitating redirection of traffic sent from a first processing device (e.g., a client) to a second processing device (e.g., a server) is disclosed. At a third processing device (e.g., a router) associated with a plurality of traffic handling systems (e.g., cache systems), traffic information is received from at least a portion of the associated traffic handling systems. The traffic information specifies which data should be redirected to the portion of associated traffic handling systems. It is determined how to redirect data received by the third processing device to a selected traffic handling system based on the received traffic information received from at least one of the associated traffic handling systems.

39 Claims, 6 Drawing Sheets

U.S. PATENT DOCUMENTS

| | | | | |
|---|---|---|---|---|
| 6,189,043 | B1* | 2/2001 | Buyukkoc et al. | 709/241 |
| 6,205,481 | B1* | 3/2001 | Heddaya et al. | 709/226 |
| 6,240,461 | B1* | 5/2001 | Cieslak et al. | 709/235 |
| 6,243,360 | B1* | 6/2001 | Basilico | 370/231 |
| 6,243,760 | B1* | 6/2001 | Armbruster et al. | 709/243 |
| 6,247,054 | B1* | 6/2001 | Malkin | 709/225 |
| 6,249,820 | B1* | 6/2001 | Dobbins et al. | 709/238 |
| 6,286,084 | B1* | 9/2001 | Wexler et al. | 709/216 |
| 6,327,622 | B1* | 12/2001 | Jindal et al. | 709/228 |
| 6,377,972 | B1* | 4/2002 | Guo et al. | 709/201 |
| 6,434,608 | B1* | 8/2002 | Desai | 709/217 |
| 6,442,558 | B1* | 8/2002 | Brown et al. | 709/218 |
| 6,470,027 | B1* | 10/2002 | Birrell, Jr. | 370/465 |
| 6,493,318 | B1* | 12/2002 | Bare | 370/238 |
| 6,499,088 | B1* | 12/2002 | Wexler et al. | 709/212 |
| 6,532,493 | B1* | 3/2003 | Aviani et al. | 709/224 |
| 6,578,066 | B1* | 6/2003 | Logan et al. | 709/105 |
| 6,683,873 | B1* | 1/2004 | Kwok et al. | 370/389 |
| 6,728,748 | B1* | 4/2004 | Mangipudi et al. | 718/105 |
| 6,735,631 | B1* | 5/2004 | Oehrke et al. | 709/226 |
| 6,826,599 | B1* | 11/2004 | Shaffer et al. | 709/213 |
| 6,832,252 | B1* | 12/2004 | Cieslak et al. | 709/225 |
| 6,839,809 | B1* | 1/2005 | Forster et al. | 709/215 |
| 2001/0014097 | A1* | 8/2001 | Beck et al. | 370/401 |
| 2001/0049741 | A1* | 12/2001 | Skene et al. | 709/232 |
| 2002/0010783 | A1* | 1/2002 | Primak et al. | 709/228 |
| 2002/0019879 | A1* | 2/2002 | Jasen et al. | 709/240 |
| 2002/0023159 | A1* | 2/2002 | Vange et al. | 709/228 |
| 2002/0040400 | A1* | 4/2002 | Masters | 709/228 |
| 2002/0062372 | A1* | 5/2002 | Hong et al. | 709/225 |
| 2002/0099849 | A1* | 7/2002 | Alfieri et al. | 709/243 |
| 2002/0129134 | A1* | 9/2002 | Leighton et al. | 709/223 |
| 2003/0014540 | A1* | 1/2003 | Sultan et al. | 709/240 |
| 2003/0133420 | A1* | 7/2003 | Haddad | 370/319 |
| 2003/0161303 | A1* | 8/2003 | Mehrvar et al. | 370/386 |
| 2004/0071141 | A1* | 4/2004 | Dhara et al. | 370/392 |
| 2005/0213832 | A1* | 9/2005 | Schofield et al. | 382/240 |

OTHER PUBLICATIONS

Dynamic Load Balancing on Web-Server Systems, Valeria Cardellini et al., May 1999, IEEE.*

Locality-Aware Request Distribution in CLuster-based Netwrok Servers, Vivek S. Pai et al., ACM 1998.*

Dynamic load balancing on Web-server systems, Cardellini, V. Colajanni, M. Yu, P.S.,Rome Univ.; Internet Computing, IEEE, May/Jun. 1999,vol. 3, Issue: 3, On pp. 28-39, ISSN: 1089-7801.*

Multimedia Caching Strategies for Heterogeneous Application and Server Environments, Multimedia Tools and Applications,☐☐Springer Netherlands,Issue vol. 4, No. 3 / May 1997, pp. 279-312.*

Charles E. Perkins and David B. Johnson, Route Optimization for Mobile IP, Cluster Computing, vol. 1, No. 2 / Jun. 1998, pp. 161-176.*

Valloppillil, Vinod, "*Cache Array Routing Protocol v1.0*", Oct. 20, 1997, Internet-Draft, http://ds1.internic/net/internet-drafts/draft-vinod-carp-v1-02.txt, pp. 1-6.

Cisco Technology, Inc., "*Configuring IP Routing Protocols,*" Dec. 10, 1997, http://www.cisco.com/univercd/data/doc/software/11_2/cnp1/5ciprout.htm#REF40277, pp. 1-6, 120-122.

Ousterhout, John K., "A Trace-Driven Analysis of the UNIX 4.2 BSD File System," Jan. 2, 1993, *Computer Science Division, Electrical Engineering and Computer Science*, University of California, Berkeley, CA, pp. 1-12.

Welch, Brent, "A Comparison of the Vnode and Sprite File System Architectures," *Proceedings of the File System Workshop*, May 1992, pp. 29-44.

Ousterhout, John K., "Beating the I/O Bottleneck: A Case for Log-Structured File Systems," Jan. 30, 1992, *Computer Science Division, Electrical Engineering anc Computer Sciences*, University of California, Berkeley, CA, pp. 1-17.

Martin Arlitt, Ludmila Cherkasova, John Dilley, Rich Friedrich And Tai Jin, OF Hewlett-Packard Laboratories, "*Evaluating Content Management Techniques For Web Proxy Caches,*" Apr. 30, 1999, 9 pages.

* cited by examiner

METHOD AND APPARATUS FOR REDIRECTING NETWORK TRAFFIC

CROSS REFERENCE TO RELATED APPLICATIONS

This application claims priority of U.S. provisional patent application, having Application No. 60/168,862 filed Dec. 2, 1999 by Cieslak et al., which application is incorporated herein by reference in its entirety for all purposes.

FIELD OF THE INVENTION

The present invention relates to transmission of data in a network environment. More specifically, the present invention relates to methods and apparatus for transparently and selectively redirecting network traffic to a selected traffic handling system, such as a cache system.

BACKGROUND OF THE INVENTION

Generally speaking, when a client platform communicates with some remote server, whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection.

Given the increase of traffic on the World Wide Web and the growing bandwidth demands of ever more sophisticated multimedia content, there has been constant pressure to find more efficient ways to service data requests than opening direct TCP connections between a requesting client and the primary repository for the desired data. Interestingly, one technique for increasing the efficiency with which data requests are serviced came about as the result of the development of network firewalls in response to security concerns. In the early development of such security measures, proxy servers were employed as firewalls to protect networks and their client machines from corruption by undesirable content and unauthorized access from the outside world. Proxy servers were originally based on Unix machines because that was the prevalent technology at the time. This model was generalized with the advent of SOCKS which was essentially a daemon on a Unix machine. Software on a client platform on the network protected by the firewall was specially configured to communicate with the resident demon which then made the connection to a destination platform at the client's request. The demon then passed information back and forth between the client and destination platforms acting as an intermediary or "proxy."

Not only did this model provide the desired protection for the client's network, it gave the entire network the IP address of the proxy server, therefore simplifying the problem of addressing of data packets to an increasing number of users. Moreover, because of the storage capability of the proxy server, information retrieved from remote servers could be stored rather than simply passed through to the requesting platform. This storage capability was quickly recognized as a means by which access to the World Wide Web could be accelerated. That is, by storing frequently requested data, subsequent requests for the same data could be serviced without having to retrieve the requested data from its original remote source. Currently, most Internet service providers (ISPs) accelerate access to their web sites using proxy servers.

Unfortunately, interaction with such proxy servers is not transparent, requiring each end user to select the appropriate proxy configuration in his or her browser to allow the browser to communicate with the proxy server. For the large ISPs with millions of customers there is significant overhead associated with handling tech support calls from customers who have no idea what a proxy configuration is. Additional overhead is associated with the fact that different proxy configurations must be provided for different customer operating systems. The considerable economic expense represented by this overhead offsets the benefits derived from providing accelerated access to the World Wide Web. Another problem arises as the number of WWW users increases. That is, as the number of customers for each ISP increases, the number of proxy servers required to service the growing customer base also increases. This, in turn, presents the problem of allocating packet traffic among multiple proxy servers.

Network caching represents an improvement over the proxy server model. Network caching is transparent to end users, high performance, and fault tolerant. By altering the operating system code of an existing router, the router is enabled to redirect data traffic of a particular protocol intended for a specified port, e.g., TCP with port 80, to one or more caching engines connected to the router via an interface having sufficient bandwidth such as, for example, a 100baseT interface. If there are multiple caching engines connected to the cache-enabled router, the router selects from among the available caching engines for a particular request based on a simple algorithm according to which a particular group of addresses is associated with each caching engine.

The caching engine to which the request is re-routed "spoofs" the requested destination platform and accepts the request on its behalf via a standard TCP connection established by the cache-enable router. If the requested information is already stored in the caching engine, i.e., a cache "hit" occurs, it is transmitted to the requesting platform with a header indicating its source as the destination platform. If the requested information is not in the caching engine, i.e., a cache "miss" occurs, the caching engine opens a direct TCP connection with the destination platform, downloads the information, stores it for future use, and transmits it to the requesting platform. All of this is transparent to the user at the requesting platform which operates exactly as if it were communicating with the destination platform. Thus, the need for configuring the requesting platform to suit a particular proxy configuration is eliminated along with the associated overhead. Moreover, traffic may be easily allocated among as many caching engines as become necessary. Thus, content caching provides a way to compensate for the bandwidth limitations discussed above. Specific examples of such a network caching technique are embodied in the Web Cache Coordination Protocol (WCCP) by Cisco Systems, which examples are further described in U.S. patent application Ser. No. 08/946,867 for METHOD AND APPARATUS FOR FACILITATING NETWORK DATA TRANS- MISSIONS filed Oct. 8, 1997. This patent application is herein incorporated by reference in its entirety for all purposes.

Although the traffic redirection mechanisms described above in relation to cache engines works well, these mechanisms provide limited traffic redirection capabilities. For example, only packets that are destined for port 80 are redirected. Additionally, all of the traffic destined for port 80 is automatically redirected without intelligently determining whether to redirect portions of such traffic. Once the cache system receives the redirected traffic, there are no mechanisms for refusing the redirected traffic. The cache system may be unable to handle such redirected traffic and accordingly redirected traffic may be halted because the destination cache system is unavailable.

Accordingly, there is a need for improved mechanisms for intelligently redirecting traffic (e.g., based on traffic characteristics). More specifically, there is a need for capabilities that allow a cache system (or other type of computer system) to refuse a redirected packet. Finally, there is also a need for mechanisms for processing and/or monitoring the redirected traffic.

SUMMARY OF THE INVENTION

Accordingly, the present invention provides an apparatus and method for intelligently and transparently redirecting and/or processing traffic. In one embodiment, a method of facilitating redirection of traffic sent from a first processing device (e.g., a client) to a second processing device (e.g., a server) is disclosed. At a third processing device (e.g., a router) associated with a plurality of traffic handling systems (e.g., cache systems), traffic information is received from at least one of the associated traffic handling systems. A determination as to how to redirect data received by the third processing device to a selected traffic handling system may be based on the traffic information received from at least one of the associated traffic handling systems. That is, each traffic handling system may specify how traffic is to be redirected to such traffic handling system. For example, a traffic handling system may select traffic destined for a particular port number.

In a preferred embodiment, the determination of redirecting data is accomplished by communicating the traffic information to at least a designated one of the associated traffic handling systems and receiving traffic redirection information from the designated traffic handling system at the third processing device. For example, the third processing device compiles traffic information received from each traffic handling system and sends the compiled traffic information to a designated traffic handling system. The designated traffic handling system then generates the traffic redirection information, which is based on the communicated traffic information. In one aspect, a data structure (e.g., a table that lists traffic information from each traffic handling system) may be built and updated based on the received traffic information. The traffic information is communicated to the designated traffic handling system within the data structure. In another aspect, when a packet is received in the third processing device from the first processing device destined for the second processing device, the packet may then be redirected to a selected one of the traffic handling systems based on the traffic redirection information.

In another method implementation, traffic information is received at a designated traffic handling system associated with a plurality of traffic handling systems and one or more routers from at least one of the routers. The traffic information specifies which data should be redirected to which associated traffic handling systems. Traffic portions are allocated to each traffic handling system based on the received traffic information. Preferably, the traffic portions are allocated by building or updating a data structure based on the traffic information received within the third processing device. The data structure specifies how to direct traffic received in the third processing device to selected traffic handling systems associated with the third processing device.

In another implementation, when a traffic handling system receives redirected traffic, the receiving traffic handling system may transmit particular data portions back to the redirecting router so that the data is reinserted into the original traffic flow. This may be done in a manner transparent to the source or destination of the packets. An example of a case in which packets would be reinserted in the original flow might be where the cache recognizes the source and destination pairs identified by the packets as corresponding to a connection requiring IP-based authentication. Another example would be where the cache is overloaded and is currently unable to handle all of the redirected traffic.

In another embodiment, the invention pertains to a computer system operable to facilitate redirection of traffic sent from a first processing device to a second processing device. The computer system includes a memory and a processor coupled to the memory. The memory and the processor are adapted to provide at least some of the above described method operations. In yet a further embodiment, the invention pertains to a computer program product for facilitating redirection of traffic sent from a first processing device to a second processing device. The computer program product has at least one computer readable medium and a computer program instructions stored within the at least one computer readable product configured to cause a processing device to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
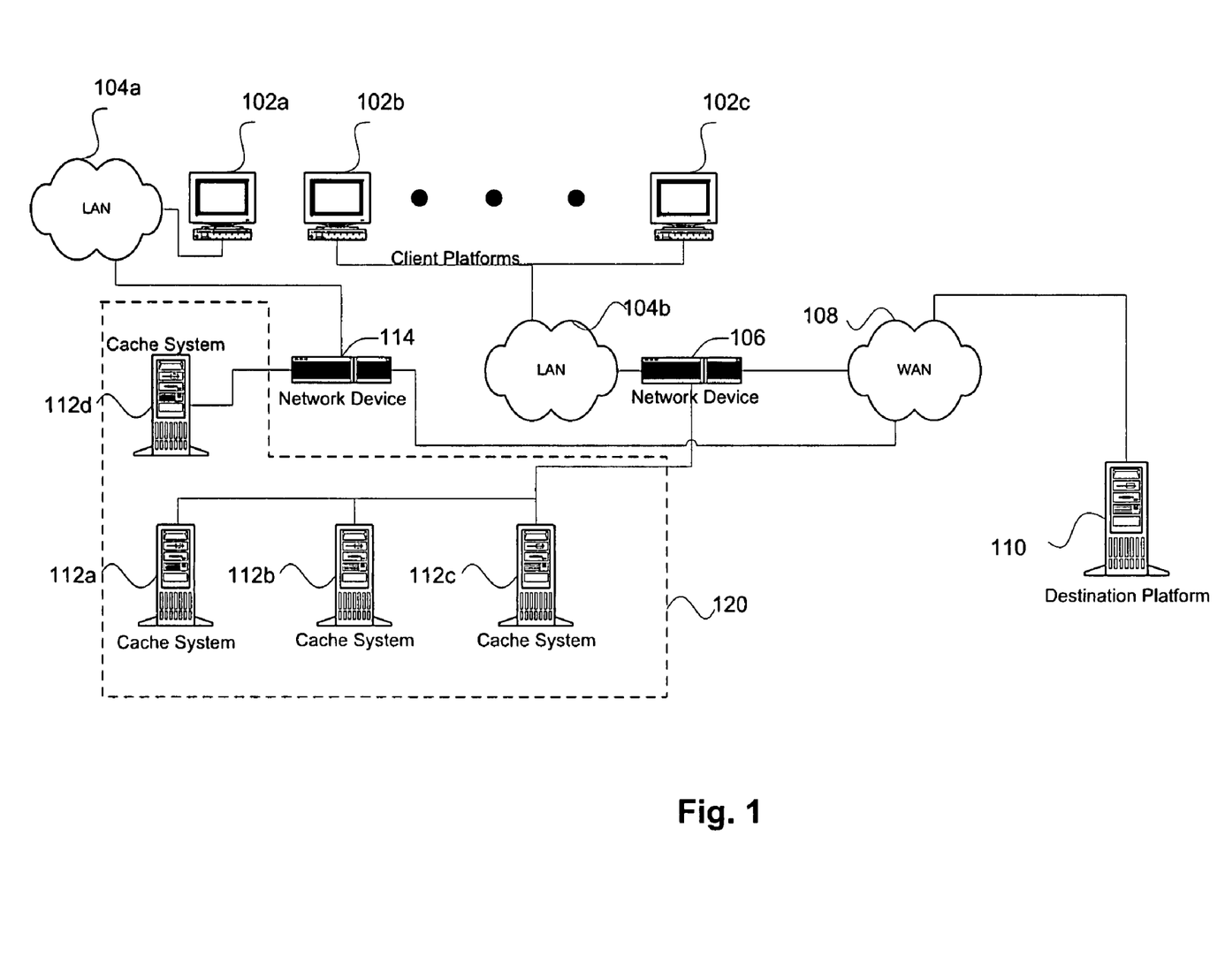
FIG. 1 is a network diagram illustrating a plurality of cache systems according to a specific embodiment of the present invention.
Figure 2:
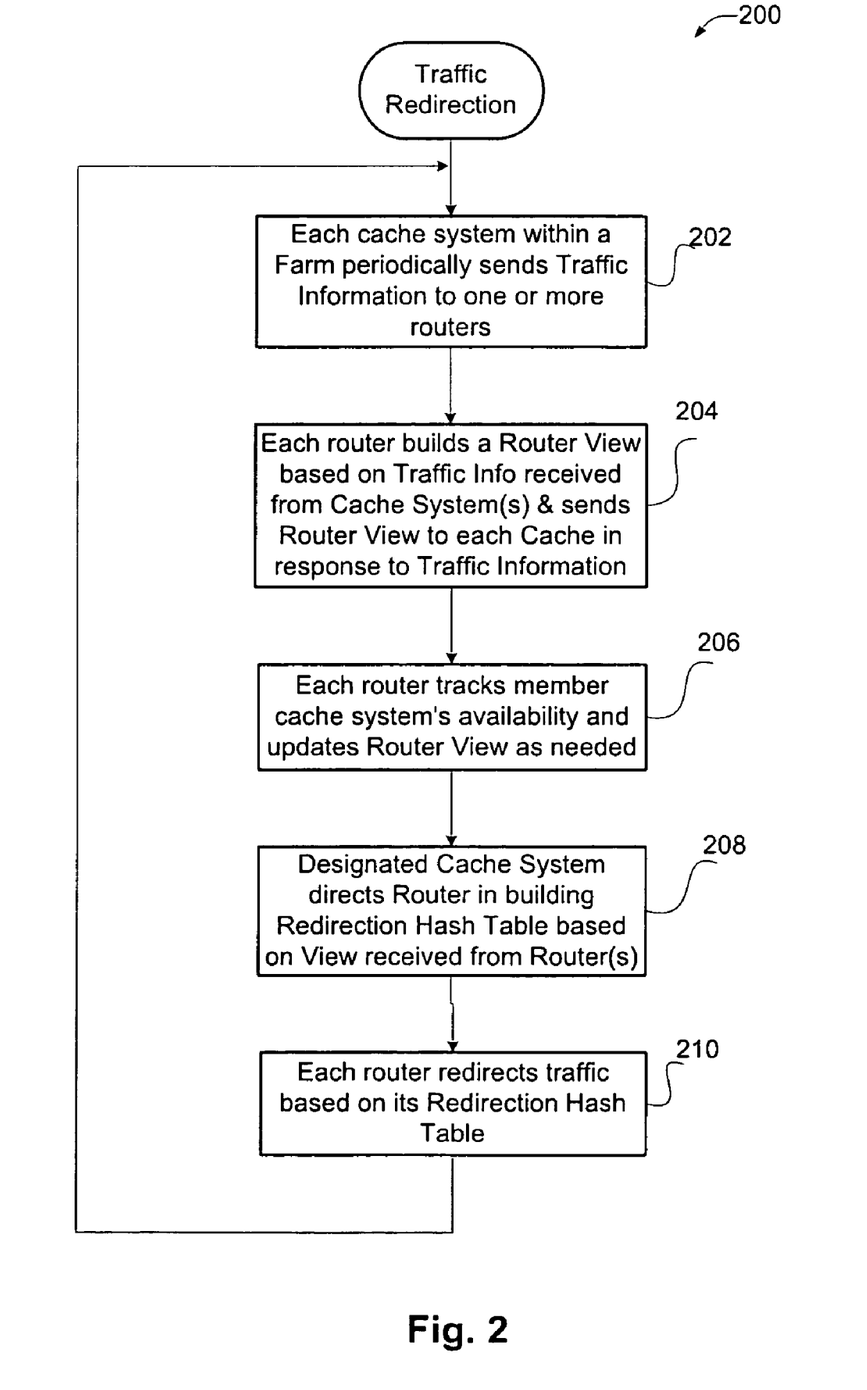
FIG. 2 is a flowchart illustrating a procedure for traffic redirection in accordance with one embodiment of the present invention.
Figure 3:
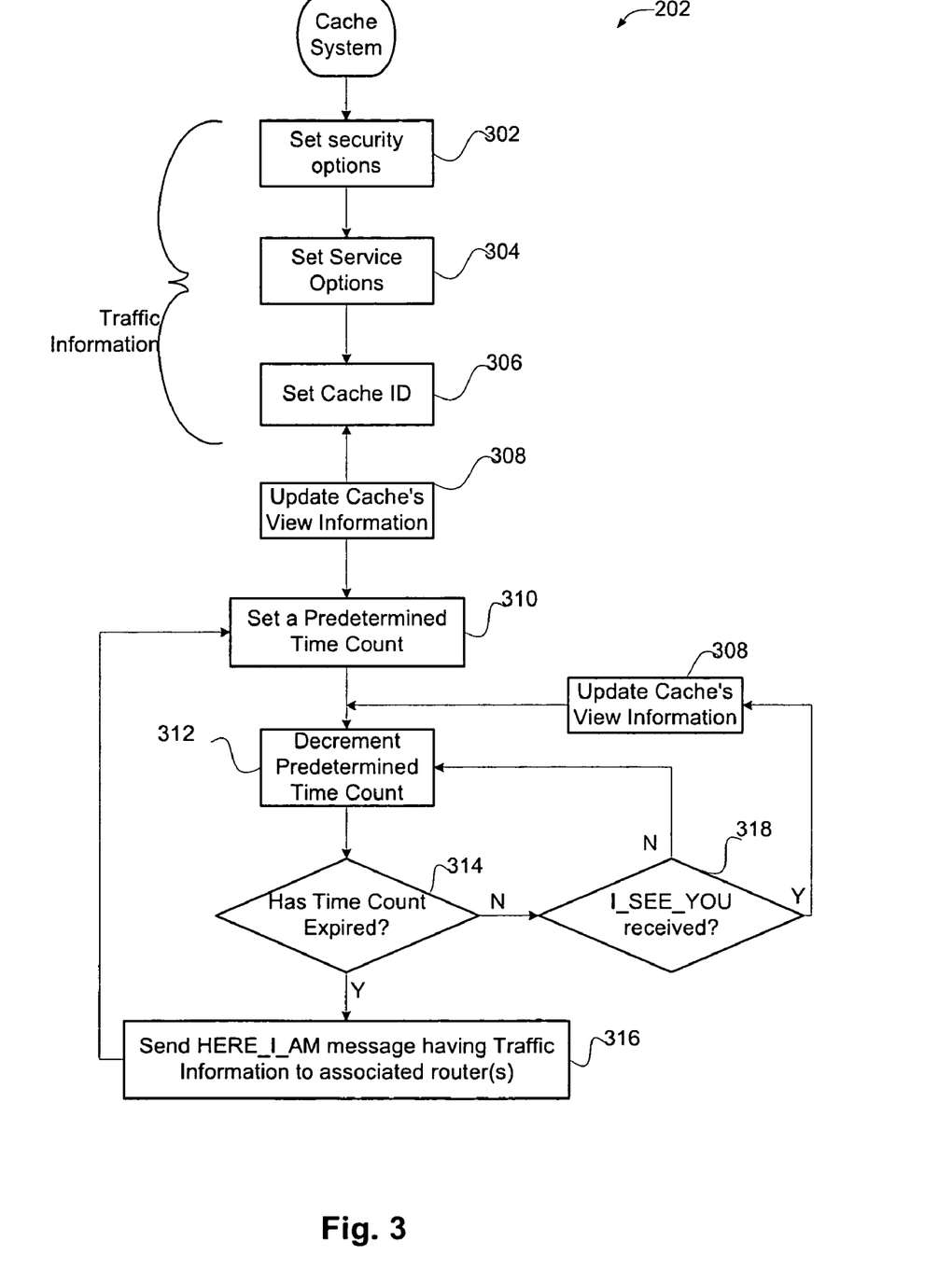
FIG. 3 is a flowchart illustrating the operation of FIG. 2 for sending Traffic Information from a cache system to one or more routers within the farm in accordance with one embodiment of the present invention.

FIG. 1 is a simplified network diagram which will be used in conjunction with the flowcharts of FIGS. 2 and 3 to describe a specific embodiment of the present invention. According to this embodiment, a plurality of client machines 102 which are resident on local area networks (LAN) 104a and 104b communicate via router 106/router 114 and wide area network (WAN) 108, e.g., the internet, with server 110. Of course, some or all of the clients 102 may communicate with the router 106 or 114 through various other configurations, rather than through a LAN. For example, a client may be coupled directly to the router 106 or there may be one or more intermediate routers between a client 102 and the router 106.

As discussed above, the router 106 may direct certain traffic, e.g., destined for port 80, to a cache system, such as 112a, which is configured to "spoof" server 110. If there are multiple caches connected to the cache-enabled router, the router selects from among the available caches for a particular request based on any suitable factor as described below with reference to FIGS. 2 through 5. For example, a first set of destination IP addresses may be assigned to cache system 112a; a second set of IP addresses to cache system 112b; a third set of IP addresses to cache system 112c; and a fourth set of IP addresses to cache system 112d.

Before sending the packet to one of its associated cache systems, the cache-enabled router 106 encapsulates the packet for transmission to the selected cache system by adding another TCP/IP header which designates the router as the source of the packet and the cache system as the destination. That is, the router encapsulates the packet for transmission to a cache system which might be several "hops" away. So, for example, router 106 might encapsulate the packet for transmission to cache system 112d which is connected to router 106 via router 114. Thus, not only may multiple cache systems be associated with a particular router, but multiple routers may be supported by an individual cache system or a group of cache systems. This allows a tremendous amount of flexibility in where the cache system and router need to be in relation to each other.

The selected cache system 112a may respond to a request from a client 102 to obtain objects from destination platform 110. The cache system 112a may retrieve objects from destination platform 110 to then present to one of the clients or may retrieve objects from its own cache (which objects were previously retrieved from the destination platform 110).

It will be understood that the network cache systems described herein may employ any of a variety of existing file systems and remain within the scope of the invention. For example, the invention may be implemented using a Unix general purpose file system or the equivalent. A particular embodiment of the invention employs the file system described in commonly assigned, U.S. Pat. No. 5,950,205 for DATA TRANSMISSION OVER THE INTERNET USING A CACHE MEMORY FILE SYSTEM issued on Sep. 7, 1999, the entire specification of which is incorporated herein by reference for all purposes.

In the illustrated embodiment, cache systems 112a, 112b, 112c, and 112d form a cache cluster or farm 120. Traffic is typically allocated to each cache system within the same cache cluster. In general terms, the present invention provides mechanisms for allocating traffic to each cache system within the same cluster. For example, traffic is allocated based on IP destination address or source address. That is, each cache system may be assigned to handle requests for objects from a particular set of destination or source addresses. After the traffic is allocated to each cache system, mechanisms are also provided for a cache system to send redirected traffic back to an associated router within the cluster, which then sends the data to its specified destination address. The cache system and/or the router may also perform any suitable number and type of data processing on such resent data, e.g., prior to reinserting the data.

FIG. 2 is a flowchart illustrating a procedure 200 for traffic redirection in accordance with one embodiment of the present invention. Initially, each cache system within a farm or cluster periodically sends Traffic Information to one or more routers in operation 202. In general terms, the Traffic Information specifies what data parameters will be utilized to determine redirection for such cache system. For example, data having a particular hashed source IP address may be sent to a particular cache system. By way of another example, data having a particular port source number may be redirected to a particular cache system.

The present invention provides a significant amount of flexibility in the kinds of services offered by the cache systems or traffic handling systems. A same router may support multiple services (e.g., specified by multiple Traffic Information). For example, router 106 may support web caching, as well as DNS caching. A same cache system may also support different services. That is, each cache system may perform any suitable traffic handling procedures (instead of or in addition to caching). By way of examples, a particular cache system may perform one or more of the following traffic handling services: monitoring traffic type and/or quantity, implementing security measures, performing standard server services, caching (e.g., web, news, ftp), and forwarding and/or filtering of received traffic. This list is not meant to be exhaustive, and therefore is not meant to limit the scope of the invention. Also, each cache system may receive different types of traffic. By way of a final example, a cache may easily be set up to perform a reverse caching procedure.

Each router then builds a Router View based on the Traffic Information received from each cache system in operation 204. Thus, a particular Router View of a particular router specifies and identifies the cache systems and their particular Traffic Information that are associated with such router. Each router also sends the Router View to each cache in response to the Traffic Information in operation 204. Additionally, each router tracks the member cache system's availability and updates the Router View as needed in operation 206. Accordingly, each cache system can know which cache systems and Traffic Information are associated with which routers within its particular cache cluster or farm.

A designated cache system may then direct the routers of the cluster in building the router's Redirection Hash Table based on the Router View received from the routers in operation 208. The Redirection Hash Table generally specifies which traffic is to be redirected to which cache system within a particular cache cluster. Each router may then redirect traffic based on its Redirection Hash Table in operation 210, and the traffic redirection procedure 200 repeats.

FIG. 3 is a flowchart illustrating the operation 202 of FIG. 2 for sending Traffic Information from a cache system to one or more routers within the farm in accordance with one embodiment of the present invention. Initially, security options are set in operation 302. Security options may include any suitable parameters for specifying security options. In a specific embodiment, the security options include a no security option and a MD5 password security option. The latter option requires that each router and cache system wishing to join a cluster be configured with the cluster password. Each WCCP protocol packet sent by a router or cache system for that cluster will contain in its security component the MD5 checksum of the WCCP protocol message and the cluster password. Each cache system and router in the cluster then authenticates the security component in a received protocol packet immediately after validating the WCCP message header. Packets failing authentication are discarded.

Service options are then set in operation 304. The service options may specify which packets are to be redirected to the particular cache system using any suitable one or more parameter(s). In the illustrated example, the service options includes a number of flags or fields for selecting which traffic to redirect to the cache system. These flags or fields may, for example, specify specific portions of the received packet that are to be hashed to create a first index to the Redirection Hash Table. In one specific implementation, any suitable combination of the following packet fields may be XOR'd together and then hashed to produce the first index: source IP address, destination IP address, source port, and destination port. The flags or fields may also specify portions of the received packet that are to be hashed to create a second index that may be used in conjunction with the first index to distribute a single bucket among a plurality of cache systems. Additionally, particular packets having specified fields (e.g., source port 8) may also be redirected to the cache system. Several service option embodiments are further described in the above referenced parent U.S. provisional Application. In sum, the service options provide a high degree of flexibility and allow each cache system to specify what traffic is to be redirected to it.

The cache ID, which uniquely identifies the cache system, is also set in operation 306. The Cache's View information is also updated or set in operation 308. The Cache View is analogous to the Router View, but includes information (e.g., cache system identifications and associated service options) specified in previously received Router Views from routers within the cache system's cluster. Initially, the Cache View may be empty or merely contain the cache's own Traffic Information.

A predetermined time count is then set in operation 310. In a specific embodiment, the predetermined time count is set to 10 seconds. The predetermined time count is then decremented in operation 312. It is then determined whether the time count has expired in operation 314. Alternatively, when the counter reaches zero, an interrupt routine may be initiated. After the time count has expired, the cache system then sends a "HERE_I_AM" message, which includes Traffic Information, to its associated routers in operation 316. The procedure then returns to operation 310 where the predetermined time count is reset. Thus, a HERE_I_AM message is sent every predetermined time count.

However, if it is determined that the predetermined time count has not expired in operation 314, it is then determined whether an I_SEE_YOU message is received in operation 318. A received I_SEE_YOU message contains the associated Router's View. If an I_SEE_YOU message is received, the cache's View information is then updated with this new received Router View information in operation 308 and the predetermined time count is decremented in operation 314. If an I_SEE_YOU message has not been received in operation 318, the cache view update operation 308 is skipped and the predetermined time count is decremented in operation 312. The time count continues to be decremented until it expires so that a HERE_I_AM message may be sent.

Each cache system within a particular cluster may implement the procedure of FIG. 3 to send HERE_I_AM messages to the routers associated with the particular cluster and receive I_SEE_YOU messages in response to the HERE_I_AM messages.

Figure 4:
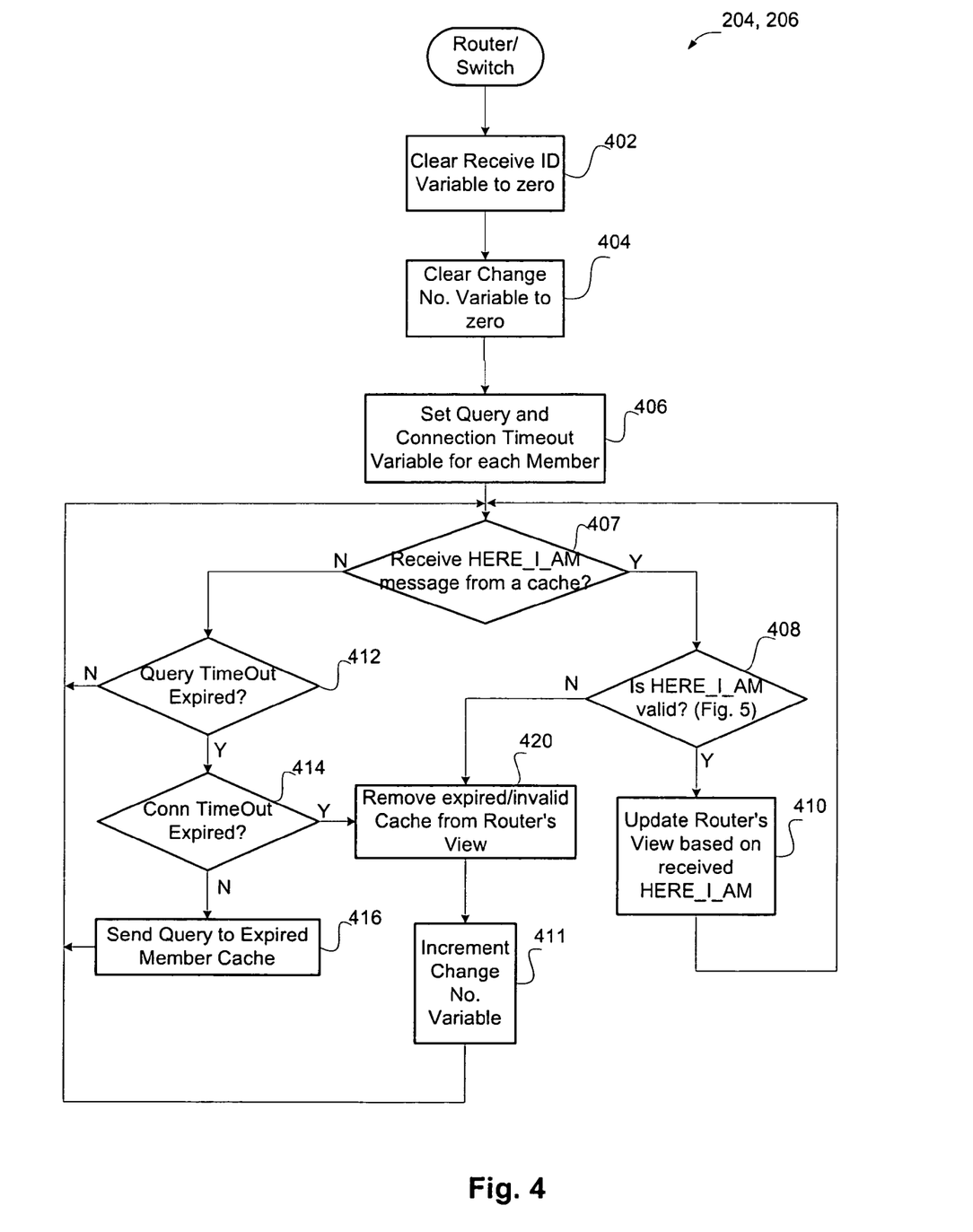
FIG. 4 is a flowchart illustrating both of the operations of FIG. 2 for periodically updating a Router View and sending it from a router to one or more cache systems within a cluster in accordance with one embodiment of the present invention.

FIG. 4 is a flowchart illustrating both of the operations 204 and 206 of FIG. 2 for periodically updating a Router View and sending it from a router to one or more cache systems within a cluster in accordance with one embodiment of the present invention. In general terms, each router builds and updates a Router View based on Traffic Information received from associated (or member) cache systems and periodically tracks each member cache system's availability. The updated Router View is then sent to each member cache system.

Initially, a Receive ID variable is cleared to zero in operation 402. The Receive ID variable is generally used to verify the authenticity of a HERE_I_AM message received from a cache system in response to an I_SEE_YOU message from the router by matching the Receive ID variables of the sent I_SEE_YOU message and a subsequently received HERE_I_AM message. A Change Number variable is also cleared in operation 404. The Change Number variable generally indicates the number of times that the membership has changed for a particular router. Thus, this variable is incremented each time the membership changes (e.g., a Cache System come online and sends a HERE_I_AM message). A Query Timeout variable and a Connection Timeout variable are set for each cache system member in operation 406. These timeout variables then begin to count down and are used to determine whether a cache system has timed out.

It is then determined whether a HERE_I_AM message is received from a cache system in operation 407. If a message is not received, it is then determined whether the Query Timeout variable has expired in operation 412. If it has not expired, the router continues to check whether a HERE_I_AM message is received from a cache system in operation 407. However, if the Query Timeout variable has expired, it is then determined whether the Connection Timeout variable has expired in operation 414. If the Connection Timeout variable has expired, the expired cache is then removed from the Router's View in operation 420. The Change No. Variable is then incremented in operation 411. The Change No. Variable generally corresponds to the number of times that the number of available/valid cache systems has changed (positive and negative changes). The procedure then again waits for a next HERE_I_AM message in operation 407.

If the Connection Timeout variable has not expired and the Query Timeout variable has expired, however, a query is then sent to the expired cache system that has not sent a HERE_I_AM message in a timely manner in operation 416. For example, an I_SEE_YOU message may be sent. The procedure then again waits for a next HERE_I_AM message in operation 407.

Turning back to operation 407, when it is determined that a HERE_I_AM message is received from a cache system, it is then determined whether the HERE_I_AM message is valid in operation 408. If the message is not valid, the invalidated cache is removed from the router's View in operation 420 and the Change No. Variable is incremented in operation 411. However, if the HERE_I_AM message is valid, the router's View is updated based on the HERE_I_AM message in operation 410. The procedure then again waits for a next HERE_I_AM message in operation 407.

Figure 5:
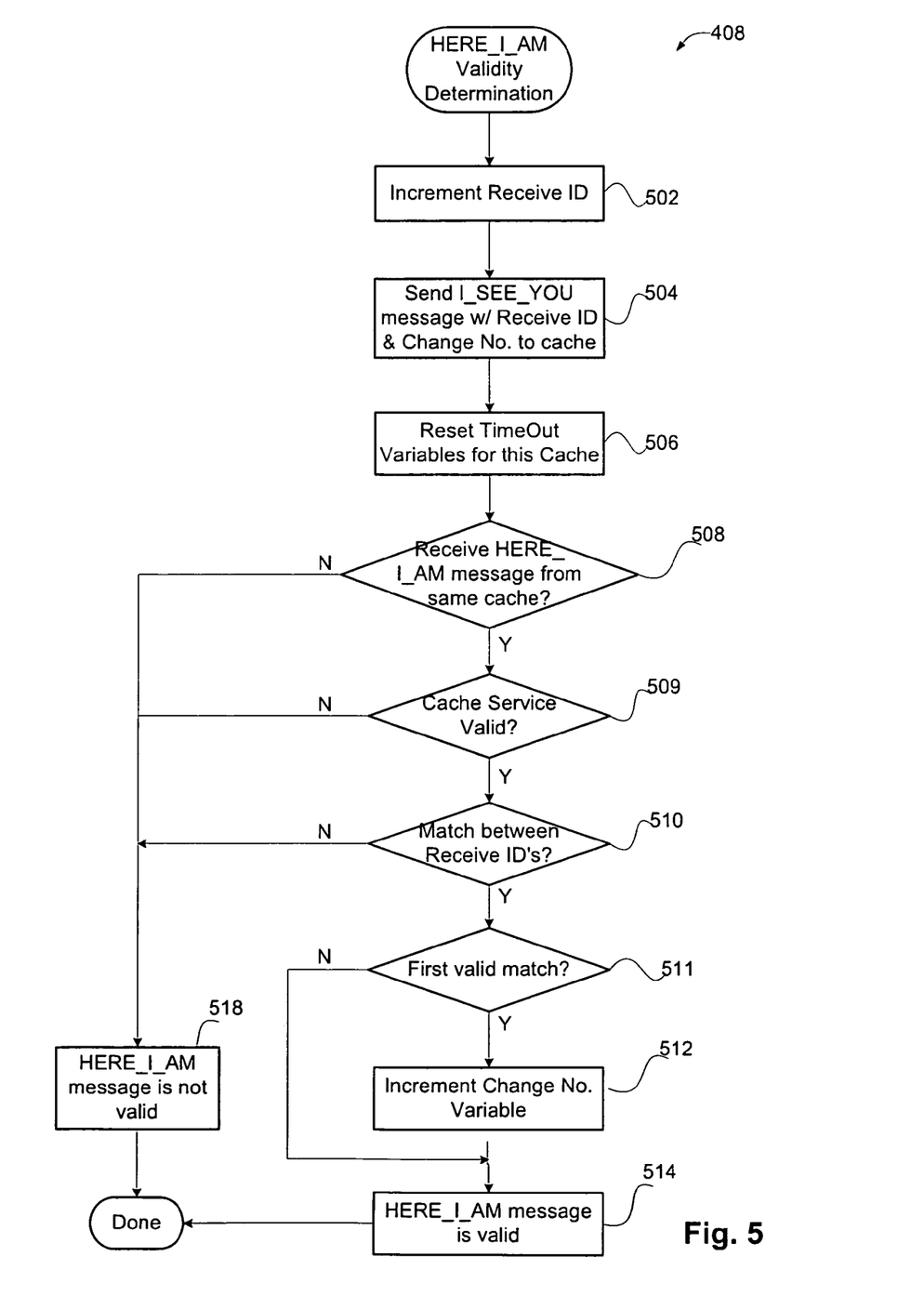
FIG. 5 is a flowchart illustrating operation of FIG. 4 for validating the HERE_I_AM message received from a cache system in accordance with one embodiment of the present invention.

FIG. 5 is a flowchart illustrating the operation 408 of FIG. 4 for validating the HERE_I_AM message received from a cache system in accordance with one embodiment of the present invention. Initially, the Receive ID is incremented in operation 502. The router then sends an I_SEE_YOU message with the incremented Receive ID and Change number to the Cache System in operation 504. Timeout variables for this cache system, which is the destination of the I_SEE_YOU message, are then reset in operation 506. It is then determined whether the received HERE_I_AM message is from the same cache system from which the previous HERE_I_AM message was sent (and to which the I_SEE_YOU was sent) in operation 508. If the HERE_I_AM message is not from the same cache system, it is determined that the HERE_I_AM message is not valid in operation 518 and the validity procedure ends.

If the HERE_I_AM message is from the same cache system, it is then determined whether the service indicated within the HERE_I_AM message from the cache system is valid in operation 509. For example, it is determined whether the specified service is supported by the particular router and/or other cluster routers. If the service is valid, it is then determined whether there is a match between the Receive IDs within the currently received HERE_I_AM message and the previously sent I_SEE_YOU message in operation 510. If there is a match, it is then determined whether this is the first valid match in operation 511. If this is the first valid match, the Change No. Variable is incremented in operation 512 since the number of available cache systems has changed (i.e., increased by one). It is then determined that the HERE_I_AM message is valid in operation 514.

If the service is not valid in operation 509 or the Receive ID's fail to match in operation 510, it is then determined that the member is no longer valid in operation 518. If this was not the first valid match in operation 511, the operation 512 for incrementing the Change No. is skipped and the HERE_I_AM is determined to be valid in operation 514.

When the HERE_I_AM message is found to be valid, the Router View is then updated in operation 410 of FIG. 4. When the HERE_I_AM message is found to be invalid, however, the particular cache system is removed from the Router View in operation 420 of FIG. 4. The Change No. Variable is also incremented in operation 411 when the cache system is removed from the Router View since the number of available cache systems has changed (i.e., decreased by one).

The above-described mechanisms facilitate traffic redirection by one or more routers to a plurality of cache systems within a particular cluster or farm. Each cache system within the cluster may specify what data should be redirected (e.g., via the above described service options) to the particular cache system. Each router may then receive specifications for redirection for each cache system within the cluster. Each router may then broadcast the specifications (e.g., via the Router View) for each cache system to each cache system within the cluster so that each cache system becomes aware of the available routers and associated cache systems within the cluster and their redirection specifications.

A designated cache system may then utilize the specifications from each cache system to allocate traffic to each cache system. For example, a first cache system may receive data destined for a first port number and a second cache system may receive data destined for a second port number. The designated cache system may be selected in any suitable manner. In one specific implementation, the cache system having the lowest IP address is the designated cache system. The designated cache system may allocate data using any suitable technique so that cache system availability and traffic redirection specifications by such cache systems is taken into account. For example, several techniques for allocating buckets are described in concurrently filed U.S. patent application, having application Ser. No. 09/608,549 entitled METHODS AND APPARATUS FOR SLOW-STARTING A WEB CACHE SYSTEM by Tiwana et al., which application is herein incorporated by reference in its entirety. These bucket allocation techniques may be easily modified so that bucket allocation is also based on data redirection specifications from each cache system. That is, bucket allocation and assignment is also based on each cache system's redirection specifications.

Once a cache system receives redirected data, it may send the data back to the router, for example. That is, the data is reinserted into the original traffic flow. This may be done in a manner transparent to the source or destination of the packets. An example of a case in which packets are reinserted in the original flow is where the cache recognizes the source and/or destination addresses of the packets as corresponding to a connection requiring IP-based authentication. Another example would be where the cache is overloaded and is currently unable to handle all of the redirected traffic. Prior to reinserting the data, the data may easily be modified for any suitable reason (e.g., by the cache system or router). For example, a prohibited destination address (e.g., pornography.com) may be modified to a different destination address (e.g., Disneyland.com®). By way of another example, informative tags may be inserted into the packet for specifying any suitable identification parameter (e.g., such as the source's geographical location). Additionally, copies of packets or packet portions may be retained for various monitoring purposes (e.g., to monitor potential hacker or terrorist activities).

The cache system may send a redirected packet back to the router utilizing any suitable technique so that the router does not attempt to redirect such returned packets. However since the returned packet will retain its original source IP address, the router cannot use this to distinguish these packets from valid candidates for redirection. There are two mechanisms to prevent redirection of returned packets: Interface-based and Encapsulated-based. The Interface mechanism requires a router to be configured to inhibit redirection of packets arriving over interfaces connected to web caches. This mechanism is efficient but is topology-dependant and thus will not always be suitable. The Encapsulation mechanism requires a web-cache to send encapsulated returned packets to the router. For example, encapsulated return packets are encapsulated in a GRE packet with a Protocol Type of 0x883E and contain the original Redirect Header. The router decapsulates the packets and forwards them without attempting to redirect.

Generally, portions of the traffic redirection techniques of the present invention may be implemented on software and/or hardware. For example, they can be implemented in an operating system kernel, in a separate user process, in a library package bound into network applications, on a specially constructed machine, or on a network interface card. In a specific embodiment of this invention, a technique of the present invention is implemented in software such as an operating system or in an application running on an operating system.

A software or software/hardware hybrid traffic redirection system of this invention is preferably implemented on a general-purpose programmable machine selectively activated or reconfigured by a computer program stored in memory. The programmable machine may be in the form of a general purpose computer that is configured to implement a cache system. The computer system generally includes a memory, processor, and network interface modules.

Such programmable machine may also be a network device designed to handle network traffic. Such network devices typically have multiple network interfaces including frame relay and ISDN interfaces, for example. Specific examples of such network devices include routers and switches. For example, the traffic redirection systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, a traffic redirection system may be implemented on one or more general-purpose network host machine such as a personal computer or workstation. Further, techniques of the invention may be at least partially implemented on a card (e.g., an interface card) for a network device or a general-purpose computing device.

Figure 6:
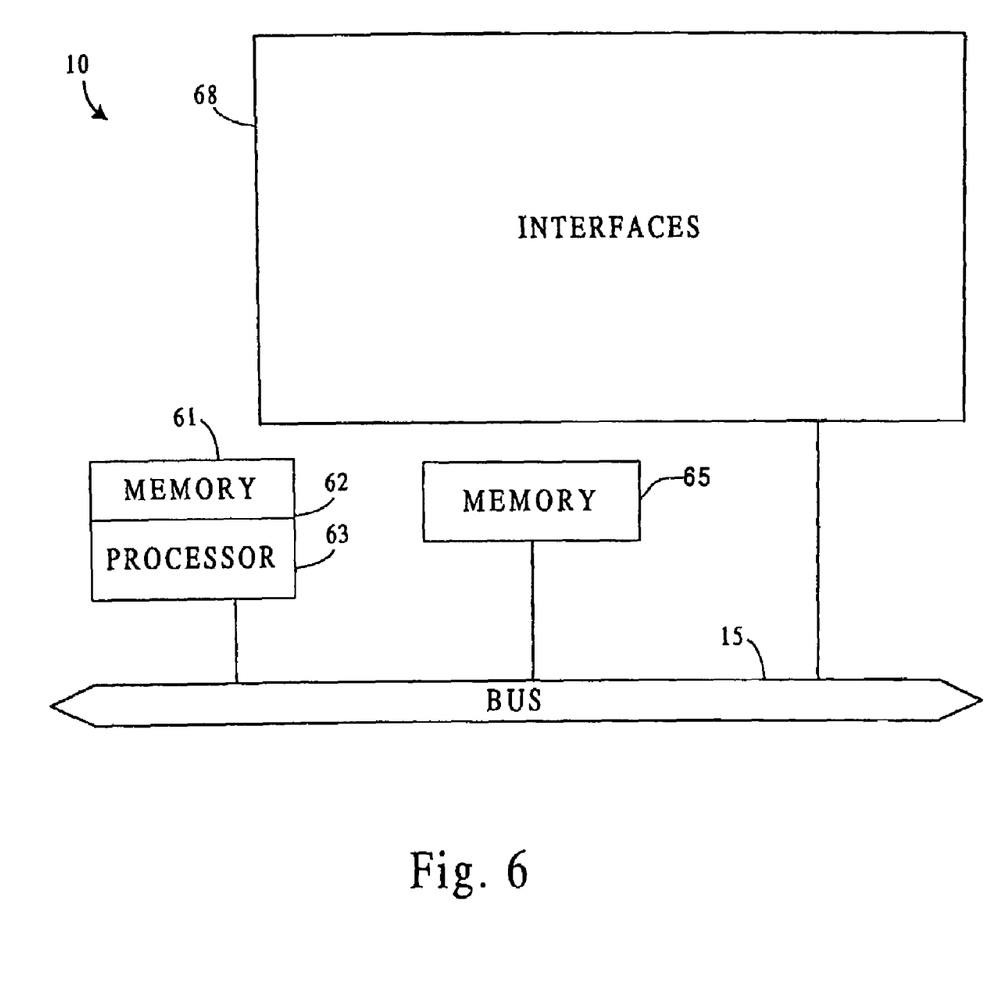
FIG. 6 is a diagrammatic representation of a router in accordance with one embodiment of the present invention.

Referring now to FIG. 6, a router 10 suitable for implementing portions of the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for determining the tasks described above for the client gateway router, the web server, the switch, the server gateway router, or each replica. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or bucket allocation and assignment mechanisms described herein. The program instructions may control the operation of an operating system and/or one or more applications, for example. The memory or memories may also be configured to store the above described Redirection Table, Router View, or Cache View.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of facilitating redirection of data sent from a first processing device to a second processing device, the method comprising:
   at a third processing device associated with a plurality of traffic handling systems, receiving traffic information from each of the associated traffic handling systems, wherein the traffic information received from each associated traffic handling system specifies which data based on at least a portion of the data should be redirected to the each associated traffic handling system;

determining how to redirect data received by the third processing device to a selected traffic handling system based on the received traffic information from each of the associated traffic handling systems;

at the third processing device, receiving data from one or more first processing devices that are destined for one or more second processing devices; and at the third processing device, redirecting the received data to selected one or more of the traffic handling systems so that the redirected data are apportioned between the traffic handling systems based on the traffic information from each of the associated traffic handling systems and at least a portion of the received data.

2. A method as recited in claim 1, wherein the determination of redirecting data is accomplished by:

communicating the traffic information to at least a designated one of the associated traffic handling systems; and at the third processing device, receiving traffic redirection information from the designated traffic handling system, the traffic redirection information being based on the communicated traffic information.

3. A method as recited in claim 2, further comprising:

at the third processing device, building or updating a data structure based on the received traffic information, wherein the traffic information is communicated to the designated traffic handling system within the data structure.

4. A method as recited in claim 2, further comprising:

in the third processing device, receiving a packet from a first processing device destined for a second processing device; and redirecting the packet to a selected one of the traffic handling systems based on the traffic redirection information.

5. A method as recited in claim 4, further comprising:

receiving the packet back in the third processing device after redirecting it to the selected traffic handling system;

determining that the packet is to be sent to the packet's original destination address instead of being redirected to the selected traffic handling system; and sending the packet from the third processing device to its original destination.

6. A method as recited in claim 5, wherein it is determined that the packet is to be sent to the packet's original destination by determining that the packet is encapsulated and de-encapsulating the packet prior to sending the packet to its original destination.

7. A method as recited in claim 6, further comprising:

in the third processing device, receiving a packet from the first processing device destined for the second processing device; and when one or more port identifiers of the received packet matches a corresponding set field of the service options of the selected traffic handling system, redirecting the packet to the selected traffic handling system.

8. A method as recited in claim 1, wherein the traffic information sent from a selected traffic handling system to the third processing device includes service options specifying which data is to be redirected to the selected traffic handling system.

9. A method as recited in claim 8, wherein the service options include a plurality of fields that are configurable to indicate that one or more fields of a packet received in the third processing device are to be used to determined redirection of packets to the selected traffic handling system.

10. A method as recited in claim 9, wherein the fields are selected from a group consisting of a source IP field, a destination IP field a source port field, a destination port field, a source IP alternative field, a destination IP alternative field, a source port alternative field, and a destination port alternative field.

11. A method as recited in claim 10, wherein each field indicates that a corresponding field of a packet received in the third processing device is to be used to generate an index to a table identifying the plurality of associated traffic handling systems, the generated index being associated with the selected traffic handling system.

12. A method as recited in claim 11, wherein each field indicates that a hashed value of the corresponding field of the received packet is to be used to generate the index to the table identifying the plurality of associated traffic handling systems.

13. A method as recited in claim 9, wherein at least one of the fields may be set to indicate one or more port identifiers of traffic received in the third processing device.

14. A method as recited in claim 9, wherein the fields are selected from a group consisting of a port 0 field, a port 1 field, a port 2 field, a port 3 field, a port 4 field, a port 5 field, a port 6 field, and a port 7 field.

15. A method as recited in claim 14, wherein the fields includes a source/destination field to indicate whether the port identifiers of the received traffic are source ports or destination ports.

16. A method as recited in claim 1, wherein the traffic information sent from a selected traffic handling system to the third processing device includes security options for specifying an authentication level for messages communicated between the third processing device and the selected traffic handling system.

17. A method as recited in claim 16, wherein the security options are configurable to select no authentication for messages communicated between the third processing device and the selected traffic handling system.

18. A method as recited in claim 16, wherein the security options are configurable to require a predetermined password encoded within messages communicated between the third processing device and the selected traffic handling system.

19. A method as recited in claim 1, wherein the traffic information sent from a selected traffic handling system includes identifying information for the selected traffic handling system.

20. A first computer system associated with a plurality of traffic handling systems and operable to facilitate redirection of data sent from a second computer system to a third computer system, the traffic being redirected to a selected traffic handling system, the computer system comprising:

a memory; and a processor coupled to the memory, wherein at least one of the memory and the processor are adapted to provide:

receiving traffic information from each of the associated traffic handling systems, wherein the traffic information received from each associated traffic handling system specifies which data based on at least a portion of the data should be redirected to the each associated traffic handling system;

communicating the received traffic information to at least a designated one of the associated traffic handling systems;

receiving traffic redirection information from the designated traffic handling system, the traffic redirection information specifying which data is to be redirected to which one of the plurality of traffic handling systems and being based on the communicated traffic information;

receiving data from one or more second computer systems that are destined for one or more third computer systems; and redirecting the received data to selected one or more of the traffic handling systems so that the redirected data is apportioned between the traffic handling systems based on the traffic information from each of the associated traffic handling systems and at least a portion of the received data.

21. A computer system as recited in claim 20, wherein at least one of the memory and the processor are further adapted to provide:

building or updating a data structure based on the received traffic information, wherein the traffic information is communicated to the designated traffic handling system within the data structure.

22. A computer system as recited in claim 20, wherein at least one of the memory and the processor are further adapted to provide:

receiving a packet from a second computer system destined for a third computer system; and redirecting the packet to a selected one of the traffic handling systems based on the traffic redirection information.

23. A computer system as recited in claim 22, wherein at least one of the memory and the processor are further adapted to provide:

receiving the packet back in the first computer system after redirecting it to the selected traffic handling system;

determining that the packet is to be sent to the packet's original destination address instead of being redirected to the selected traffic handling system; and sending the packet from the first computer system to its original destination.

24. A computer system as recited in claim 23, wherein it is determined that the packet is to be sent to the packet's original destination by determining that the packet is encapsulated and de-encapsulating the packet prior to sending the packet to its original destination.

25. A computer system as recited in claim 20, wherein the traffic information sent from a selected traffic handling system includes service options specifying which data to be redirected to the selected traffic handling system.

26. A computer system as recited in claim 25, wherein the service options include a plurality of fields that are configurable to indicate that one or more fields of a packet received in the first computer system are to be used to determined redirection of packets to the selected traffic handling system.

27. A computer system as recited in claim 26, wherein the fields are selected from a group consisting of a source IP field, a destination IP field, a source port field, a destination port field, a source IP alternative field, a destination IP alternative field, a source port alternative field, and a destination port alternative field.

28. A computer system as recited in claim 27, wherein each field indicates that a corresponding field of a packet received in the first computer system is to be used to generate an index to a table identifying the plurality of associated traffic handling systems, the generated index being associated with the selected traffic handling system.

29. A computer system as recited in claim 28, wherein each field indicates that a hashed value of the corresponding field of the received packet is to be used to generate the index to the table identifying the plurality of associated traffic handling systems.

30. A computer system as recited in claim 26, wherein at least one of the fields may be set to indicate one or more port identifiers of traffic received in the computer system.

31. A computer system as recited in claim 30, wherein the fields are selected from a group consisting of a port 0 field, a port 1 field, a port 2 field, a port 3 field, a port 4 field, a port 5 field, a port 6 field, and a port 7 field.

32. A computer system as recited in claim 31, wherein the fields includes a source/destination field to indicate whether the port identifiers of the received traffic are source ports or destination ports.

33. A computer system as recited in claim 30, wherein at least one of the memory and the processor are further adapted to provide:

receiving a packet from a first processing device destined for a second processing device; and when one or more port identifiers of the received packet matches a corresponding set field of the service options of the selected traffic handling system, redirecting the packet to the selected traffic handling system.

34. A computer system as recited in claim 33, wherein the traffic information sent from a selected traffic handling system to the first computer system includes security options for specifying an authentication level for messages communicated between the first computer system and the selected traffic handling system.

35. A computer system as recited in claim 34, wherein the security options are configurable to select no authentication for messages communicated between the first computer system and the selected traffic handling system.

36. A computer system as recited in claim 34, wherein the security options are configurable to require a predetermined password encoded within messages communicated between the first computer system and the selected traffic handling system.

37. A computer system as recited in claim 20, wherein the traffic information sent from a selected traffic handling system includes identifying information for the selected traffic handling system.

38. A computer readable storage medium, that is in the form of magnetic media, optical media, or magneto-optical media, for facilitating redirection of data sent from a first processing device to a second processing device, comprising computer readable code that is stored on such computer readable storage medium and that is configured for performing the following operations:

receiving traffic information, at a third processing device associated with a plurality of traffic handling systems, from each of the associated traffic handling systems, wherein the traffic information received from each associated traffic handling system specifies which data based on at least a portion of the data should be redirected to the each associated traffic handling system;

communicating the traffic information to at least a designated one of the associated traffic handling systems;

receiving traffic redirection information, at the third processing device, from the designated traffic handling system, the traffic redirection information specifying which data is to be redirected to which one of the plurality of traffic handling systems and being based on the communicated traffic information;

receiving data, at the third processing device, from one or more first processing devices that are destined for one or more second processing devices; and redirecting, at the third processing device, the received data to selected one or more of the traffic handling systems so that the redirected data are apportioned between the traffic handling systems based on the traffic information from each of the associated traffic handling systems and at least a portion of the received data.

39. An apparatus for facilitating redirection of data sent from a first processing device to a second processing device, wherein the apparatus is associated with a plurality of traffic handling systems, the apparatus comprising:

means for receiving traffic information from each of the associated traffic handling systems, wherein the traffic information received from each of the associated traffic handling systems specifies which data based on at least a portion of the data should be redirected to the each associated traffic handling system;

means for determining how to redirect data received by the apparatus to a selected traffic handling system based on the received traffic information;

means for receiving data, at the third processing device, from one or more first processing devices that are destined for one or more second processing devices; and means for redirecting, at the third processing device, the received data to selected one or more of the traffic handling systems so that the redirected data are apportioned between the traffic handling systems based on the traffic information from each of the associated traffic handling systems and at least a portion of the received data.

* * * * *